(12) United States Patent
Persson

(10) Patent No.: US 6,619,069 B1
(45) Date of Patent: Sep. 16, 2003

(54) FLEXIBLE CONVEYOR BELT AND A CLIMATE CHAMBER COMPRISING A BELT OF THAT KIND

(75) Inventor: Sven Persson, Glumslöv (SE)

(73) Assignee: AGA Aktiebolag, Lidingo (SE)

( * ) Notice: Subject to any disclaimer, the term of this patent is extended or adjusted under 35 U.S.C. 154(b) by 0 days.

(21) Appl. No.: 09/857,587
(22) PCT Filed: Nov. 17, 1999
(86) PCT No.: PCT/SE99/02103
§ 371 (c)(1), (2), (4) Date: Jan. 16, 2002
(87) PCT Pub. No.: WO00/34160
PCT Pub. Date: Jun. 15, 2000

(30) Foreign Application Priority Data
Dec. 8, 1998 (SE) .............................................. 9804250

(51) Int. Cl.$^7$ .............................................. F25D 25/02
(52) U.S. Cl. .................................. 62/381; 62/63; 62/64; 62/380
(58) Field of Search .............................. 62/381, 63, 64, 62/380

(56) References Cited

U.S. PATENT DOCUMENTS

| | | | |
|---|---|---|---|
| 3,729,773 A | * 5/1973 | Dillon | 17/11 |
| 3,733,848 A | * 5/1973 | Duron et al. | 62/381 |
| 3,866,432 A | * 2/1975 | Harrison | 62/208 |
| 4,953,365 A | * 9/1990 | Lang et al. | 62/381 |
| 5,170,631 A | * 12/1992 | Lang et al. | 62/63 |
| 5,205,135 A | * 4/1993 | Lang | 62/381 |
| 5,247,810 A | 9/1993 | Fenty | |
| 5,343,715 A | * 9/1994 | Lang | 62/381 |
| 5,350,056 A | 9/1994 | Hager | |
| 5,803,232 A | 9/1998 | Froderberg | |

FOREIGN PATENT DOCUMENTS

| | | |
|---|---|---|
| EP | 128 270 | 12/1984 |
| SE | 469752 | 9/1993 |

* cited by examiner

Primary Examiner—William C. Doerrler
Assistant Examiner—Mark Shulman
(74) Attorney, Agent, or Firm—Pearne & Gordon LLP

(57) ABSTRACT

Flexible conveyor belt of the type which can be assembled to form an endless loop, a part of which forms a number of layers stacked one on another. The belt (3) is constructed from mutually articulatable links which each comprise at least two transverse rods (13) which, at each side edge of the belt, bear support members (12) projecting upwardly from the plane of the belt, which are intended to support a belt layer lying above. The links are interconnected so that they can be displaced relative to one another along at least one side edge of the belt. The support members (12) are connected to the ends of the transverse rods (13) in the belt (3) or constitute extensions of these rods and comprise a stirrup-shaped support portion which projects upwardly from the plane of the belt and interconnects the rods (13) in an associated link of the belt. The invention also relates to a climate chamber comprising a belt according to the above, and a method for treating products in such a climate chamber.

22 Claims, 6 Drawing Sheets

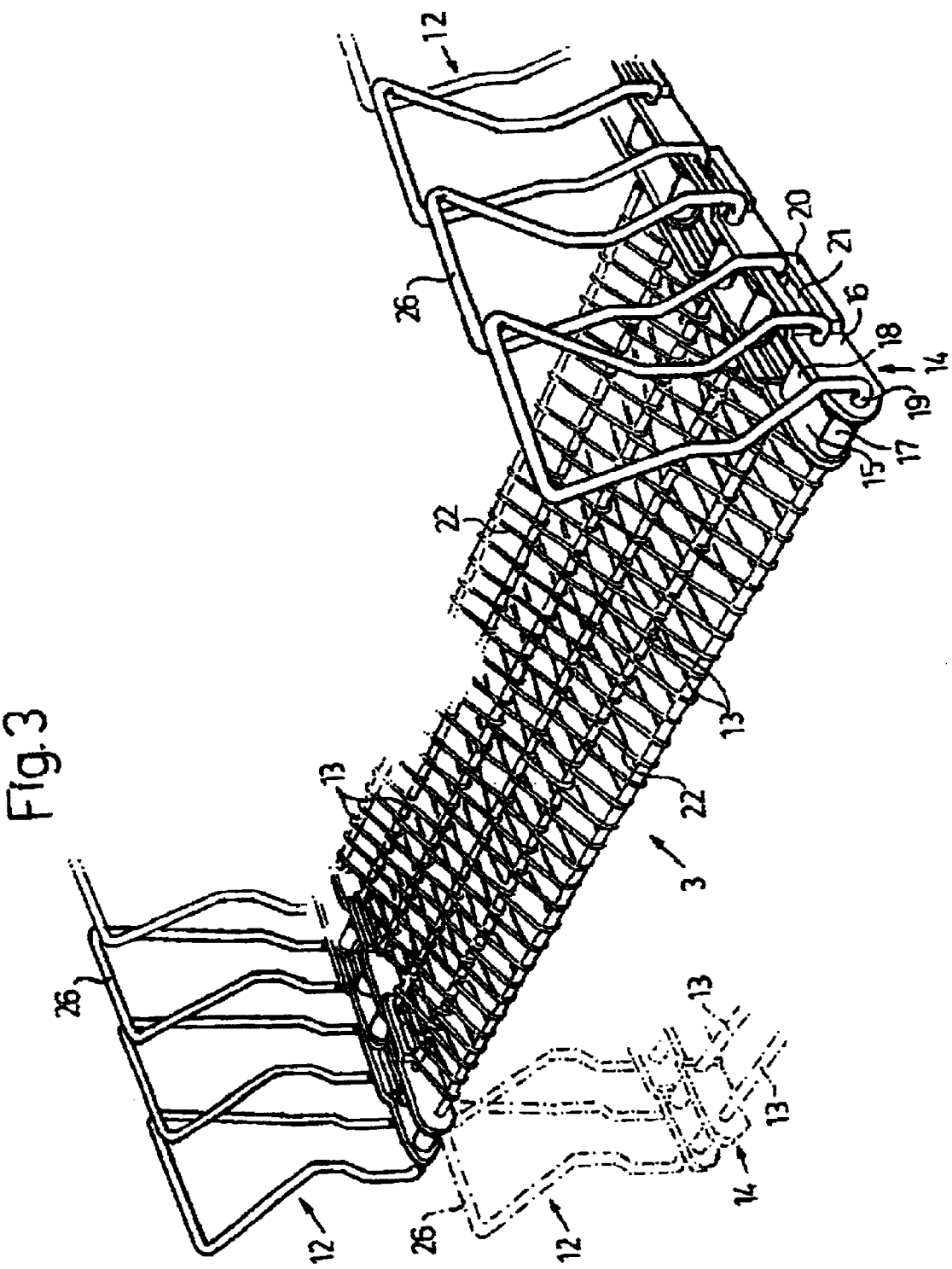

Figure 1:
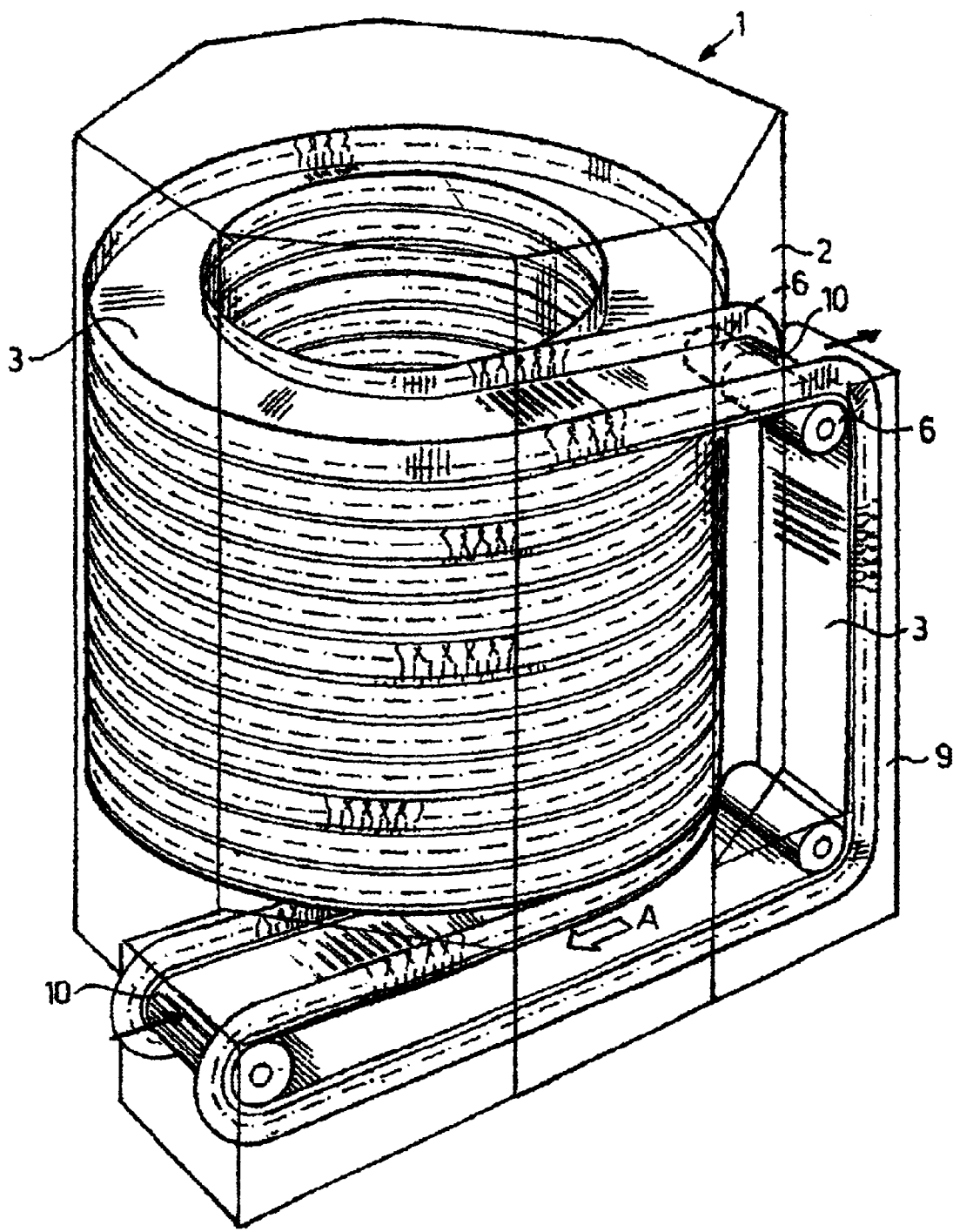

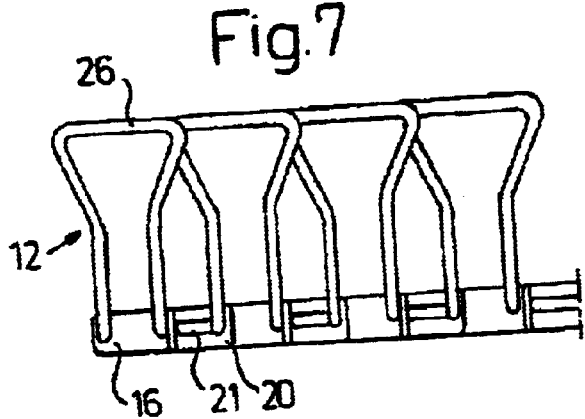
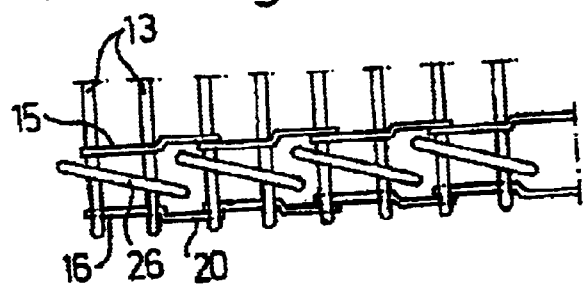
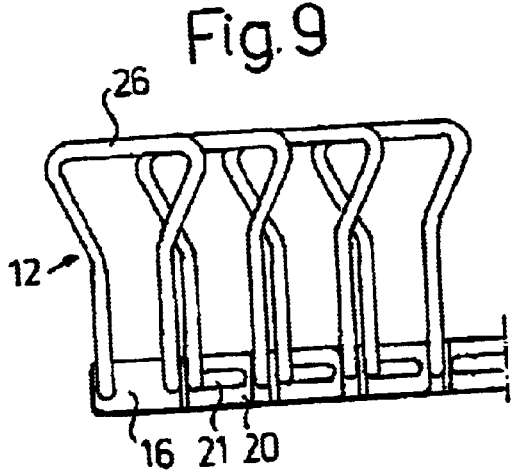
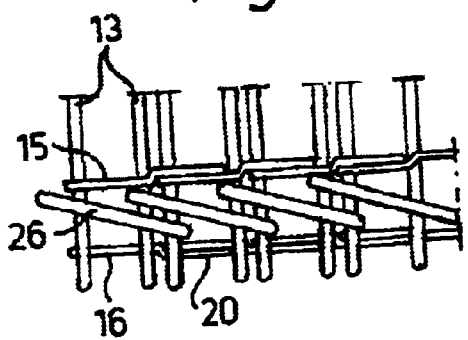

FLEXIBLE CONVEYOR BELT AND A CLIMATE CHAMBER COMPRISING A BELT OF THAT KIND

This application claims the benefit of International Application Number pct/se99/02103, which was published in English on Jun. 15, 2000.

The present invention relates in general to equipment for treating products continuously in a climate chamber by circulating a gas or gas mixture, air or steam around these. The invention relates in particular to what is known as a helical freezer and a flexible, self-stacking conveyor belt intended for use in this freezer, which belt is in the form of an endless loop, a part of which forms a number of helically running layers stacked one on another. A refrigerating medium is then circulated around the products present on the belt.

In addition to freezing, climate chambers with a belt of this type can also be used for other types of treatment of products, such as cooling, heating, boiling, sterilizing, drying, moistening etc. of products.

Climate chambers of this type have great capacity and afford good production economy because they allow continuous mass-treatment of products and require a relatively small amount of space.

The length of the endless loop of the conveyor belt and the speed of the latter are adapted so that the products have the requisite dwell time in the climate chamber for the treatment required. For maximum utilization of the space in a climate chamber of given dimensions, the belt must then be made so that it has the maximum possible useful loading area and so that the belt can be stacked in layers located one on another with the minimum possible construction height. The belt must also allow gas flows to be directed at the products in both the vertical and the horizontal direction at the same time as having a flexibility which allows it to be bent in the vertical direction both upwards and downwards and to form bends in at least one direction in the horizontal plane.

Climate chambers of this type with flexible conveyor belts are as described in, for example, EP 0 333 565, U.S. Pat. No. 5,190,143, U.S. Pat. No. 5,247,810 and U.S. Pat. No. 5,460,260.

The arrangement according to EP 0 333 565 comprises a belt with side walls formed by plates which are borne by the individual links in the belt. These side walls impede gas flows in the horizontal direction. Moreover, the belt is not self-stacking because it is supported by support rails along its inner edge. The freezer also contains a refrigerating machine, which increases the dimensions considerably as well as the air volume which has to be cooled to freezing temperature.

U.S. Pat. No. 5,347,810 and 5,247,810 also describe arrangements, in which the links of the belt are made with side plates which impede the gas flow. These plates also limit the width of the useful loading area of the belt.

In the arrangement according to U.S. Pat. No. 5,460,260, the side plates of the links used in the arrangements according to the patent specifications mentioned above have been replaced with stirrups which allow gas flow in the horizontal direction also. This known conveyor belt can be assembled to from an endless loop, a part of which forms a number of layers stacked one on another. To this end, the belt is constructed from mutually articulatable links which each comprise at least two transverse rods which, at each side edge of the belt, bear support members projecting upwardly from the plane of the belt, which are adapted so as to be capable of supporting a belt layer lying above, and which links are interconnected so that they can be displaced relative to one another along at least one side edge of the belt.

The stirrups serving as support members are welded firmly to plates which are arranged on the transverse rods of the belt inside outer connecting links which guide and interconnect the rods in parts. This results in inter alia the useful loading width of the belt being reduced considerably. Furthermore, the mounting of the stirrups by welding to carrier plates, which have to be slipped onto and fixed to the transverse rods, necessitates the number of production stages being increased, which prolongs the production time and increases production cost. The angled portions of the stirrups welded firmly to the plates also have disadvantages from the point of view of hygiene because pockets which collect dirt and are difficult to clean are formed between the angled portions and the associated plate.

One object of the present invention is to provide a flexible conveyor belt of the type described above, which comprises stirrup-shaped support members which allow helical self-stacking in a very reliable manner without encroaching appreciably on the useful loading width of the belt. Furthermore, the stirrups are to be capable of being mounted in a rational and cost-saving manner and so that it is easy to maintain higher hygiene standards during use of the belt.

To this end, the support members are connected to the ends of the transverse rods in the belt or constitute extensions of these rods, each support member comprising a stirrup-shaped support portion which projects upwardly from the plane of the belt and interconnects the rods in an associated link of the belt.

By virtue of the fact that the stirrups are connected to the ends of the transverse rods of the belt, the mounting of the stirrups does not encroach on the useful loading width of the belt. Furthermore, it is not necessary for any separate mounting plates to be arranged on the rods because the stirrups can simply be jointed to the ends of the transverse rods by using jointing sleeves which are stamped or welded firmly onto the rods. This renders production and maintenance less expensive and also allows improved hygiene during use of the belt.

The invention also relates to a climate chamber, in particular for what is known as a helical freezer, with a self-stacking conveyor belt of the type indicated above.

In this connection, one object is to provide as compact a helical freezer as possible, which requires a belt with a large effective loading area. According to the invention, the need for a refrigerating machine arranged in the freezer is eliminated by virtue of freezing being effected by means of cold gas from an external source, which also contributes to compact construction.

The invention also relates to a method for continuous treatment of products in such a climate chamber, according to which a gas or gas mixture is circulated around the products while they pass through the climate chamber, carried by the helically self-stacking conveyor belt.

The method is intended in particular to allow effective circulation of gas around the products in a climate chamber of very compact construction.

The especially characteristic features of the various aspects of the invention emerge from the patent claims below.

Figure 2:
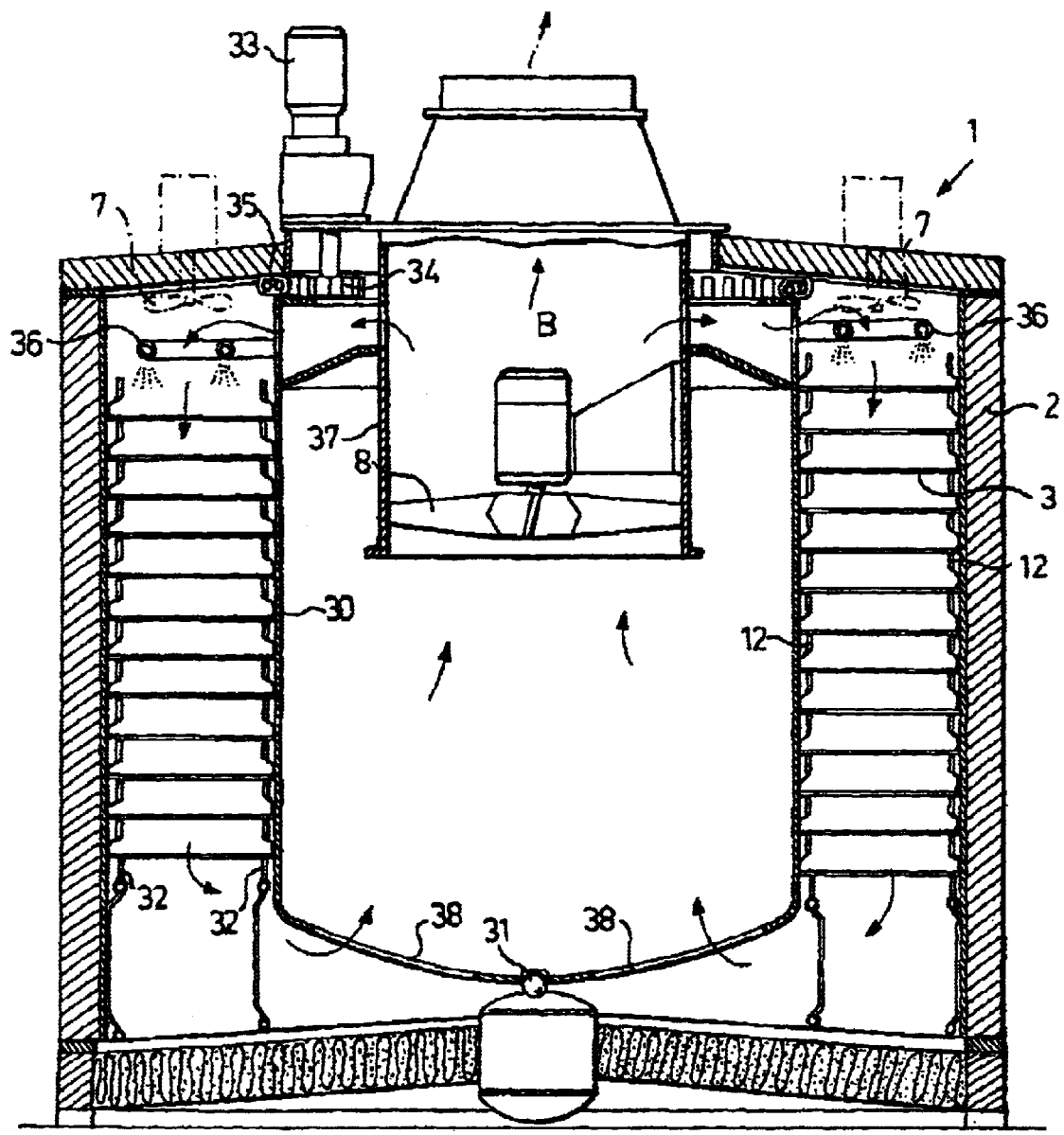
Figure 6:
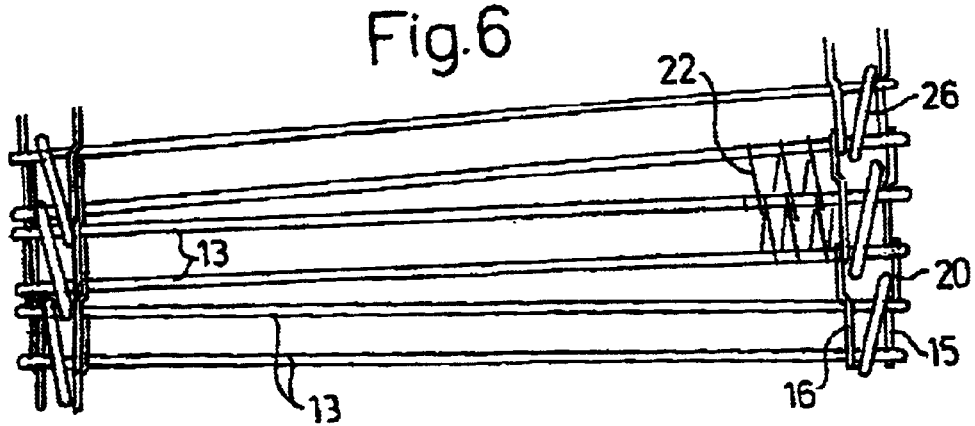
Figure 5:
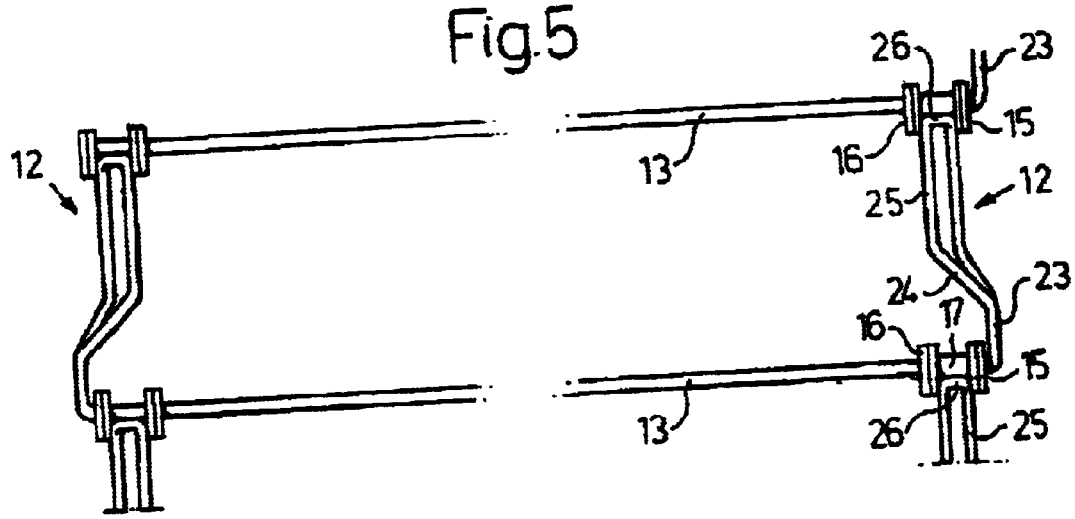
Figure 4:
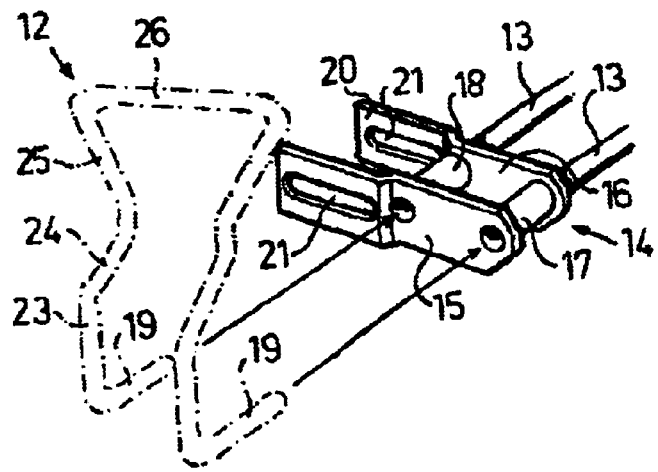
Figure 11:
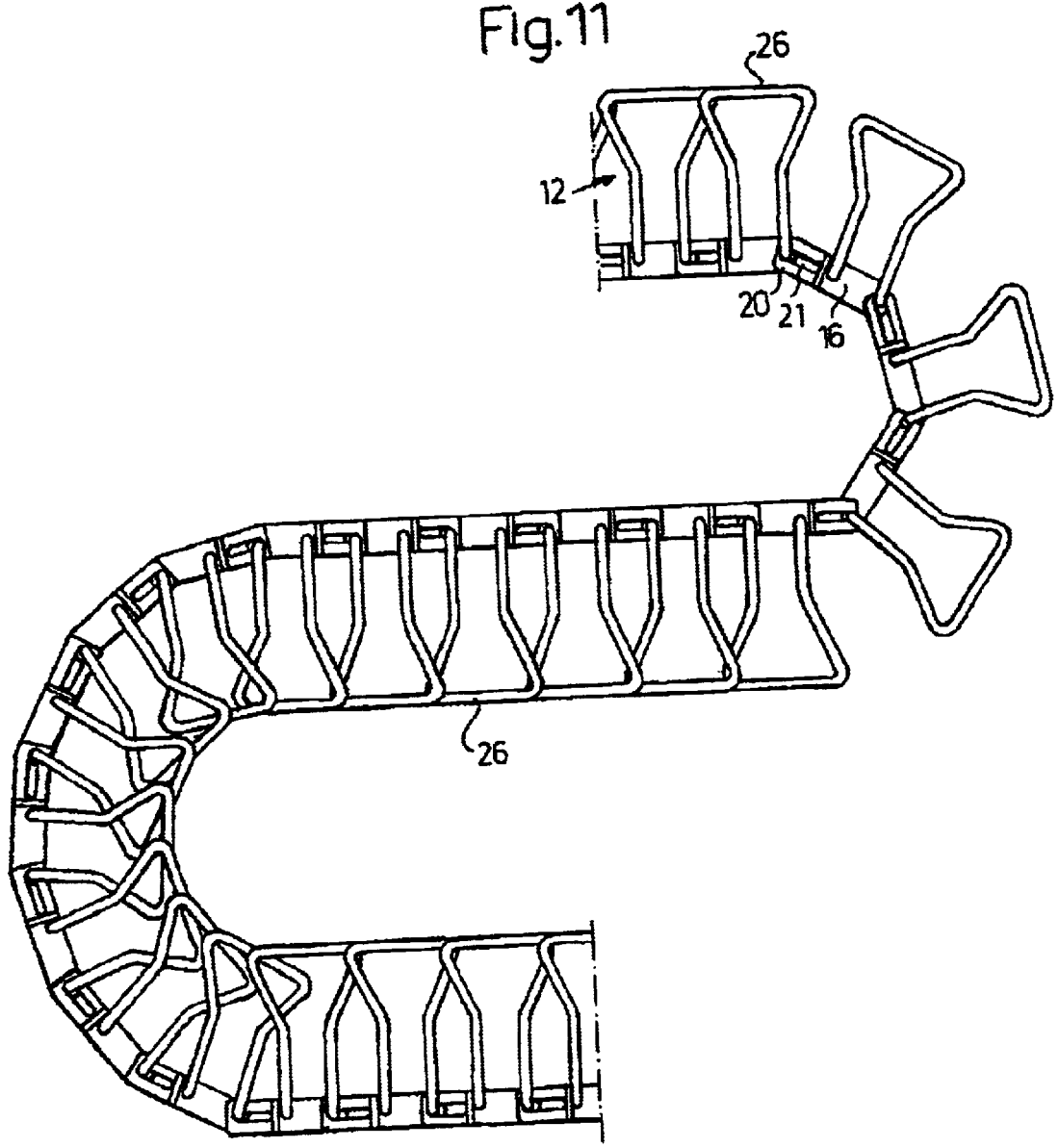

The invention will be described in greater detail below with reference to the embodiments shown by way of example in the appended drawings, in which FIG. 1 shows very diagrammatically a climate chamber with a conveyor belt according to the present invention, FIG. 2 is a vertical section through a climate chamber of the type shown in FIG. 1, FIG. 3 is a perspective view of a part of the conveyor belt according to the invention, FIG. 4 shows the end of a link of the conveyor belt, FIG. 5 illustrates diagrammatically stacking of two layers of the conveyor belt one on another, FIG. 6 illustrates how the links in the conveyor belt can be displaced towards one another on bending of the belt in the lateral direction, FIGS. 7 and 8 show the relative positions of the support stirrups when the belt is straight, FIGS. 9 and 10 illustrates the relative positions of the support stirrups when the belt is bent, and FIG. 11 shows the conveyor belt according to FIG. 3 when it is bent to and fro in the vertical direction.

FIG. 1 shows diagrammatically a climate chamber 1 with an octagonal outer casing 2 which encloses a helically self-stacking conveyor belt 3. Owing to its shape, the casing can surround the belt stack very closely, which results in a compact arrangement. For the sake of clarity, the belt has been shown very diagrammatically without inner and outer drums so as to illustrate more clearly how the belt is stacked.

Self-stacked means that the conveyor belt can form a number of layers positioned one on another, where the belt is, in every layer except for the lowest, completely supported by the belt in the layer lying immediately below. This requires the belt to be flexible so that it can be bent in at least one direction in the horizontal plane and so that it can be bent both upwards and downwards in the vertical direction.

The lowest layer or turn in the band stack suitably rests on a sliding strip or a rotatable bottom ring which has an inclined surface which imparts the desired gradient to the belt stack.

The belt 3 can be driven in the direction shown by the arrow A by means of a rotatable inner drum and/or a bottom ring supporting the belt stack. Stretching of the belt for the desired degree of pressing of the latter against the drum is effected by means of one or more motors 6 interacting with the guide rollers 5.

Reference number 9 designates a cover which surrounds that portion of the belt 3 located outside the casing 2 so as inter alia to reduce refrigerating losses to the surrounding area. The points at which products are put onto the belt and, respectively, frozen products are removed from the belt are designated by 10. For this purpose, chutes or guide rails can be used for feeding the products in and out. This allows the entire conveyor belt 3 to be located in the climate chamber with its cover 9, no part of the belt being exposed to the higher temperature which surrounds the climate chamber.

FIG. 2 shows a cross section through a helical freezer of the type illustrated in FIG. 1. The conveyor belt 3, the embodiment of which is described in greater detail below, forms a helical stack around a central drum 30 which is in this case supported centrally on a ball joint 31. The belt stack rests on slide rails 32 and follows the rotation of the drum 30. The drum is rotated by means of a motor 33 with a wheel 34 which is in engagement with a track 35 with engagement openings on the upper part of the drum.

For freezing of the products present on the belt 3, a gaseous refrigerant, specifically a cryogenic gas, to which category carbon dioxide also belongs in this context, is suppplied from an external sdource. The gas is supplied via a number of nozzles arranged above the belt stark 3 on a pipe loop 36 which runs above the stack and is connected to the external refrigerant source. The pipe loop suitably consists of at least two parallel pipes bent essentially into a horseshoe shape.

By virtue of the fact that the cryogenic gas is supplied from an external source, the casing 2 can surround the belt stack relatively closely so as to reduce the volume of the arrangement and thus the gas volume which has to be kept cold.

The gas which is supplied via the pipe loop 36 can, as a result of the construction of the belt, pass through the entire belt stack and in doing so circulate around and bring about effective freezing of the products on the belt. Gaseous refrigerant can also be supplied to the various layers of the belt stack in the horizontal direction if so desired.

Suspended in the drum 30 is an inner tubular fan drum 37 which comprises a central fan arrangement 8. By means of this, refrigerant is made to pass through the belt stack so as then to be sucked into the drum 30 via large openings 38 arranged in the bottom thereof. From the pressure side of the central fan 8, the gas is pushed back out to the belt stack to mix with newly supplied gas and to pass the products again. Some of the gas is released from the freezer via an adjustable register in the direction of arrow B.

The gas circulation through the belt stack is therefore effected by means of a single central fan arrangement 8 which is positioned in the central void formed in the centre of the belt stack, which results in a very compact construction of the freezer because no extra space is required for the fan arrangement.

If so desired or required, extra fans 7 can be arranged with uniform interspaces in the space above the belt stack, which contributes to pushing the gas down through the belt stack.

As the conveyor belt 3 has to be flexible, meet high hygiene standards and also withstand great temperature variations, it is made in the form of link of stainless material which are movable relative to one another. The links are suitably made of stainless wires and rods, which allows the gas flows in the climate chamber to be made to circulate around the products in the desired direction. It is therefore of utmost importance that the links do not have any upwardly projecting side plates which form inner and outer side walls in the stack, which prevent the gas flow in the horizontal direction. To this end, the support members along the side edges of the belt are, according to the invention, made in the form of wire stirrups 12, indicated only diagrammatically in FIGS. 1 and 2, which are entirely open to gas flows.

FIG. 3 shows a section of a conveyor belt according to the invention. This is constructed in the form of links which are movable relative to one another and each comprise two transverse rods 13 which are maintained at the desired mutual spacing by means of distance members 14 arranged at the ends.

The distance members 14 (see also FIG. 4) each consist of two essentially parallel plates 15, 16 which in this embodiment are maintained at a defined spacing by means of two jointing sleeves 17 and 18. The jointing sleeves are used for jointing the end portions of the transverse rods 13 together with lower bent-around portions 19 of the support stirrups 12, as can be seen from FIG. 4. The rods 13, and the portions 19, can be fixed in the jointing sleeves 17, and 18 by welding or stamping.

The plates 15 and 16 are made with portions 20 which project in the lateral direction and each have a slot-shaped opening 21 for receiving the end portion of a transverse rod 13 of the closest adjacent link and that bent-around portion 19 of one leg of the support stirrup 18 of this link which is intended for jointing together with this rod. The plate portions 20 are located at a greater spacing from one another than the plates 15, 16 otherwise are, so that the plates 15, 16 in one link can be displaced in between the plate portions 20 in an adjacent link, as will be explained below.

As can be seen from FIG. 3, the belt is equilateral and the support stirrups 12 are made in such a manner that a belt layer lying below supports a layer lying above by interaction between the stirrup-shaped support portions 12 in the layer lying below and the jointing sleeves 17, 18 connecting the distance plates 15, 16 in the layer lying above. The equilateral nature of the belt means that it can be turned, and the same wear can be obtained along both edges, thus extending the life of the belt.

In order to form a load-bearing surface of the conveyor belt, which is open to gas flows, the transverse rods 13 are bound together in pairs by means of a helically wound wire 22. This means that the pair of transverse rods 13 in each link can be displaced towards or away from the pair of transverse rods 13 in the closest adjacent link. One rod 13 of this link will then be displaced in the slot-shaped openings 21 in the plate-shaped portions 20 of the distance plates of the first link.

The construction described above of a conveyor belt according to the invention means that use can be made of the maximum width of the conveyor belt as a loaded-bearing surface and that the belt will meet very high hygiene standards because the construction essentially eliminates dirt-collecting pockets and holes.

FIG. 5 illustrates diagrammatically the stacking of two layers of a conveyor belt according to the invention one on another. To this end, the stirrup-shaped support portions are made in such a manner that they are inclined in over the belt. In this connection, the legs of the stirrups have a lower, essentially vertical portion 23 which constitutes an extension of the bent-around end portion 19 inserted into the jointing sleeve 17. The vertical portion 23 merges with a portion 24 which forms an acute angle with the plane of the belt. The inclined portions 24 each merge with an upper, essentially vertical leg portion 25, which portions 25 are located slightly to the side of one another seen in the longitudinal direction of the belt. This is achieved by virtue of the fact that the inclined portions 24 form slightly different angles with the plane of the belt or are of different length. The upper ends of the vertical portions 25 are then interconnected by means of a portion 26 which is angled in relation to the longitudinal direction of the belt. The portion 26 interacts with the jointing sleeve 17 in the belt layer lying above and is guided safely between the distance plates 15 and 16 in this layer.

FIG. 6 shows a horizontal view of the belt when it is bent in the horizontal direction. As can be seen, the links consisting of pairs of rods 13 are then displaced towards one another at the inner edge of the bend, while the mutual spacing between the rods is maintained at the outer edge of the bend. The displacement between the links at the inner edge of the bend can take place because the pairs of distance plates which interconnect the links can be displaced into one another, as illustrated. The movements of the rod 13 towards one another are not impeded by the helically wound wires 22 either. As can be seen, the upper portions 26 of the support stirrups 12 will be guided between the distance plates 15, 16 at both the inner edge and the outer edge of the bend. This results in the very safe guidance, which eliminates the risk of the stack collapsing as a result of "derailment", which can occur in certain known constructions.

FIGS. 7 and 8 show more clearly the mutual positions of the support stirrups 12 and the distance plates 15, 16, seen from the side and, respectively, from above, at the outer edge of the bend where no displacement have taken place between these.

FIGS. 9 and 10 show the relative positions of the stirrups and the distance plates at the inner edge of the bend where the links of the belt have been displaced towards one another. The distance plates 15, 16 of one link have then been displaced in between the plate portions 20 of the closest adjacent link and one leg of each support stirrup 12 has been displaced in the slot-shaped openings 21 of the plate portions 20. This is possible because the angled upper portions 26 of the support stirrups 12 can then be displaced in behind one another.

Instead of all displacement between the links taking place at the inner edge of the bend, the starting position can be such that the links are brought closer to one another at the inner edge and are moved further from one another at the outer edge of the bend. In this case also, good guidance is obtained between the various layers in a helical stack formed by the belt.

In order for the conveyor belt to be capable of forming a helical stack, the belt must also be capable of being bent to and fro in the vertical direction. This is illustrated in FIG. 11. It can be seen from this figure that the previously described construction of the links of the belt according to the invention makes the belt very flexible in the vertical direction also. In this case also, the angled upper portions 26 make it possible for the stirrup-shaped support members 12 to be displaced in behind one another (see the lower bend in FIG. 11).

If the links in the belt are only to be displaced towards and away from one another at the inner edge of a bend, the links along the other edge of the belt can be permanently fixed at a certain mutual spacing, the distance plates at this other edge not then needing to have any slot-shaped openings 21.

Although not shown, the driving of the belt is suitably effected using toothed wheels or the like, which engage with the jointing sleeves 17, 18 interconnecting the distance plates. The toothed wheels can then be made in such a manner that the pitch of the teeth is changed depending on the direction in which the belt is being bent.

By virtue of the fact that both driving and support of each layer takes place using the jointing sleeves 17, 18 which are of greater diameter than the rods 13, wear is reduced, which extends the life.

The invention has been described above in connection with the embodiment shown by way of example in the appended drawing. Within the scope of the invention, however, this can be varied in a number of respects with regard to the concrete embodiment of the various components of the belt and the climate chamber.

What is claimed is:

1. Flexible conveyor belt of the type which can be assembled to form an endless loop, wherein a part of said endless loop forms a number of layers stacked one on another, the belt (3) being constructed from mutually articulatable links which each comprise at least two transverse rods (13) which, at each side edge of the belt, bear support members (12) projecting upwardly from the plane of the belt, which are adapted so as to be capable of supporting a belt layer lying above, and which links are interconnected so that they can be displaced relative to one another along at least one side edge of the belt, characterized in that first portions of the support members (12) are connected axially to the ends of the transverse rods (13) in the belt (3) or constitute axial extensions of these rods, and in that each support member comprises a second stirrup-shaped support portion which projects upwardly from the plane of the belt and interconnects the rods (13) in an associated link of the belt.

2. Conveyor belt according to claim 1, characterized in that the first portions of each support member (12) along one edge of the belt (3) constitute axial extensions of the rods (13) in the belt, and in that the first portions of each support member along the other edge of the belt are jointed axially to the free ends of the rods.

3. Conveyor belt according to claim 2, characterized in that the two rods (13) in each link constitute integral parts of one and the same rod, the central portion of which has been bent to form a stirrup-shaped support portion which interconnects the two rods (13) at one edge of the belt (3), and in that the free ends of the rods at the other edge of the belt are jointed axially to a separate support member.

4. Conveyor belt according to claim 1, characterized in that said support members (12) are jointed axially to the respective end portions of the transverse rods (13) in the associated link of the belt.

5. Conveyor belt according to claim 4, characterized in that the support members (12) are connected to the rods by means of jointing sleeves (17, 18).

6. Conveyor belt according to claim 1, characterized in that the stirrup-shaped support portions (12) are inclined in over the belt (3) so as to be capable of supporting a belt layer lying above.

7. Conveyor belt according to claim 6, characterized in that the stirrup-shaped support portions (12) are adapted so as to interact in a supporting manner with end portions of the transverse rods (13) in a belt (3) layer lying above or jointing sleeves (17, 18) slipped onto these end portions.

8. Conveyor belt according to claim 6, characterized in that the stirrup-shaped support portions (12) have an upper part (25) with a greater spacing between the legs than the spacing between the transverse rods (13) in the belt (3), and in that these upper parts are angled in relation to the longitudinal direction of the belt so that they can move in behind one another during displacement of the links towards one another.

9. Conveyor belt according to claim 8, characterized in that the legs in said upper part (25) of the stirrup-shaped support portions (12) essentially form a right angle with the plane of the belt (3), and in that the legs in a part (24) located lower form an acute angle with the plane of the belt (3) so as to be capable of meeting the ends of the transverse rods (13) in the belt.

10. Conveyor belt according to claim 9, characterized in that said part (24) of the legs which forms an acute angle with the plane of the belt (3) is located between said upper part (25) of the legs, which essentially forms a right angle with the plane of the belt, and a lower part (23) of the legs, which also essentially forms a right angle with the plane of the belt.

11. Conveyor belt according to claim 8, characterized in that the spacing between the legs of the stirrup-shaped support portions (12) is essentially constant and the same as the spacing between associated rods (13) in the belt (3) from these rods and as far as said upper part (25) where the spacing between the legs increases successively up to an essentially horizontal support part (26) interconnecting the legs.

12. Conveyor belt according to claim 11, characterized in that the support part (26) interconnecting the legs forms an angle with the longitudinal direction of the belt (3) while those lower end portions (19) of the legs which are connected to the transverse rods (13) are located along a line which is parallel to the longitudinal direction of the belt.

13. Conveyor belt according to claim 1, characterized in that each pair of adjacent rods (13) is bound together by means of a helically wound wire (22).

14. Conveyor belt according to claim 1, characterized in that the end portions of the transverse rods (13) in each link are connected by means of a distance member (14), in that said member projects towards the closest-lying rod (13) in an adjacent link, and in that the projecting portion (20) of said member is made with a guide slot (21) for receiving the end portion of the latter rod.

15. Conveyor belt according to claim 14, characterized in that the distance member (14) comprises two essentially parallel plate-shaped elements (15, 16) located at a mutual spacing, in that the stirrup-shaped support members (12) in a belt (3) layer lying below are adapted so as to interact in a supporting manner with those parts of the end portions of the transverse rods (13) forming part of a layer lying above which are located between the two plate-shaped elements (15, 16), and in that these elements form guides for the support parts of the support members (12) in the belt layer lying below.

16. Conveyor belt according to claim 15, characterized in that the separate support members (12) are axially connected to the transverse rods (13) by means of jointing sleeves (17, 18) located between the two plate-shaped elements (15, 16).

17. Climate chamber continuous treatment of products carried by a helically self-stacking conveyor belt, characterized in that the conveyor belt (3) is made according to claim 1.

18. Climate chamber according to claim 17 in the form of what is known as a helical freezer, characterized in that it comprises nozzles so as to supply gaseous refrigerating medium from an external source for freezing products which pass through the chamber (1).

19. Climate chamber according to claim 17, characterized in that the belt (3) is completely enclosed in the casing of the climate chamber (1).

20. Climate chamber according to claim 18, characterized in that it comprises members (7, 8) which bring about essentially horizontal and/or essentially vertical flows of cryogenic gas towards the products on the belt (3).

21. Climate chamber according to claim 18, characterized in that it comprises a fan (8) which is arranged in a fan drum (30) arranged centrally in the helical stack and which causes the gas supplied, after passing the products on the belt (3), to pass through the fan drum and subsequently supplied to the products again.

22. Climate chamber according to claim 21, characterized in that it comprises an adjustable register on the pressure side of the central fan (8) so as to release some of the gas flow from the climate chamber (1).

* * * * *